(12) United States Patent
Lu et al.

(10) Patent No.: US 7,800,648 B2
(45) Date of Patent: Sep. 21, 2010

(54) ELECTRONIC APPARATUS WITH AN IMAGE-CAPTURING DEVICE

(75) Inventors: Yao-Ju Lu, Taipei (TW); Hsi-Yung Liu, Taipei (TW)

(73) Assignee: Compal Communications, Inc., Neihu, Taipei (TW)

(*) Notice: Subject to any disclaimer, the term of this patent is extended or adjusted under 35 U.S.C. 154(b) by 541 days.

(21) Appl. No.: 11/827,575

(22) Filed: Jul. 11, 2007

(65) Prior Publication Data

US 2008/0012944 A1   Jan. 17, 2008

(30) Foreign Application Priority Data

Jul. 14, 2006   (TW) ............... 95125851 A (51) Int. Cl.
*H04N 5/225* (2006.01)
(52) U.S. Cl. .................................. 348/207.1
(58) Field of Classification Search ............. 348/207.1, 348/207.11, 333.06, 373, 375, 376
See application file for complete search history.

(56) References Cited

U.S. PATENT DOCUMENTS

| | | | | |
|---|---|---|---|---|
| 5,734,414 A | * | 3/1998 | Nishimura et al. ....... 348/14.05 |
| 6,118,653 A | * | 9/2000 | Kim ....................... 361/679.23 |
| 6,812,958 B1 | * | 11/2004 | Silvester .................. 348/207.1 |
| 6,965,413 B2 | * | 11/2005 | Wada ........................ 348/376 |
| 7,061,536 B2 | * | 6/2006 | Cha ........................... 348/376 |
| 7,126,816 B2 | * | 10/2006 | Krah ..................... 361/679.55 |
| 7,130,186 B2 | * | 10/2006 | Yu ........................ 361/679.27 |
| 7,256,987 B2 | * | 8/2007 | Weng ................... 361/679.55 |
| 7,272,423 B2 | * | 9/2007 | Satoh et al. .............. 455/575.3 |
| 7,286,181 B2 | * | 10/2007 | Cha ........................... 348/373 |
| 7,570,485 B2 | * | 8/2009 | Krah ..................... 361/679.23 |
| 2005/0168924 A1 | * | 8/2005 | Wu et al. ................... 361/683 |
| 2005/0231587 A1 | * | 10/2005 | Root et al. ............... 348/14.07 |

\* cited by examiner

*Primary Examiner*—Lin Ye
*Assistant Examiner*—Trung Diep
(74) *Attorney, Agent, or Firm*—Winston Hsu (57) ABSTRACT

An electronic apparatus includes a housing unit and an image-capturing device. The image-capturing device includes a support unit mounted rotatably on the housing unit so as to be rotatable relative thereto about a first axis, a casing unit coupled to the support unit in such a manner so as to be co-rotatable therewith about the first axis while being rotatable relative thereto about a second axis transverse to the first axis, and a lens unit mounted on the casing unit.

11 Claims, 7 Drawing Sheets

ELECTRONIC APPARATUS WITH AN IMAGE-CAPTURING DEVICE

CROSS-REFERENCE TO RELATED APPLICATION

This application claims priority of Taiwanese application no. 095125851, filed on Jul. 14, 2006, the disclosure of which is incorporated herein by reference.

BACKGROUND OF THE INVENTION

1. Field of the Invention

The invention relates to an electronic apparatus, more particularly to an electronic apparatus with an image-capturing device.

2. Description of the Related Art

A conventional electronic apparatus, such as a notebook computer, includes an image-capturing device, such as a camera, mounted fixedly thereon.

The aforementioned conventional electronic apparatus is disadvantageous in that, when reorienting the image-capturing device, the entire conventional electronic apparatus has to be moved. This causes inconvenience to users.

SUMMARY OF THE INVENTION

Therefore, the main object of the present invention is to provide an electrical apparatus with an adjustable image-capturing device.

According to the present invention, an electronic apparatus comprises a housing unit and an image-capturing device. The image-capturing device includes a support unit, a casing unit, and a lens unit. The support unit of the image-capturing device is mounted rotatably on the housing unit so as to be rotatable relative thereto about a first axis. The casing unit of the image-capturing device is coupled to the support unit so as to be co-rotatable therewith about the first axis, and is rotatable relative to the support unit about a second axis transverse to the first axis. The lens unit is mounted on the casing unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
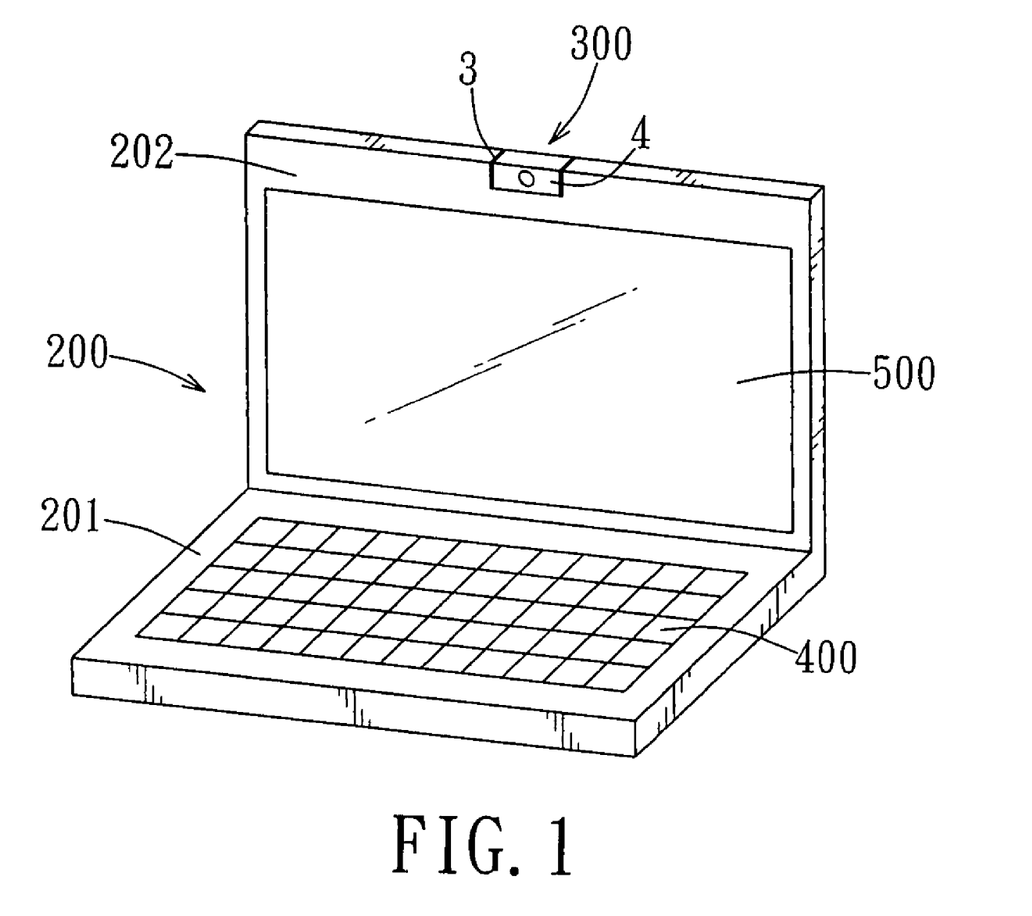
FIG. 1 is a perspective view of the preferred embodiment of an electronic apparatus according to this invention.
Figure 2:
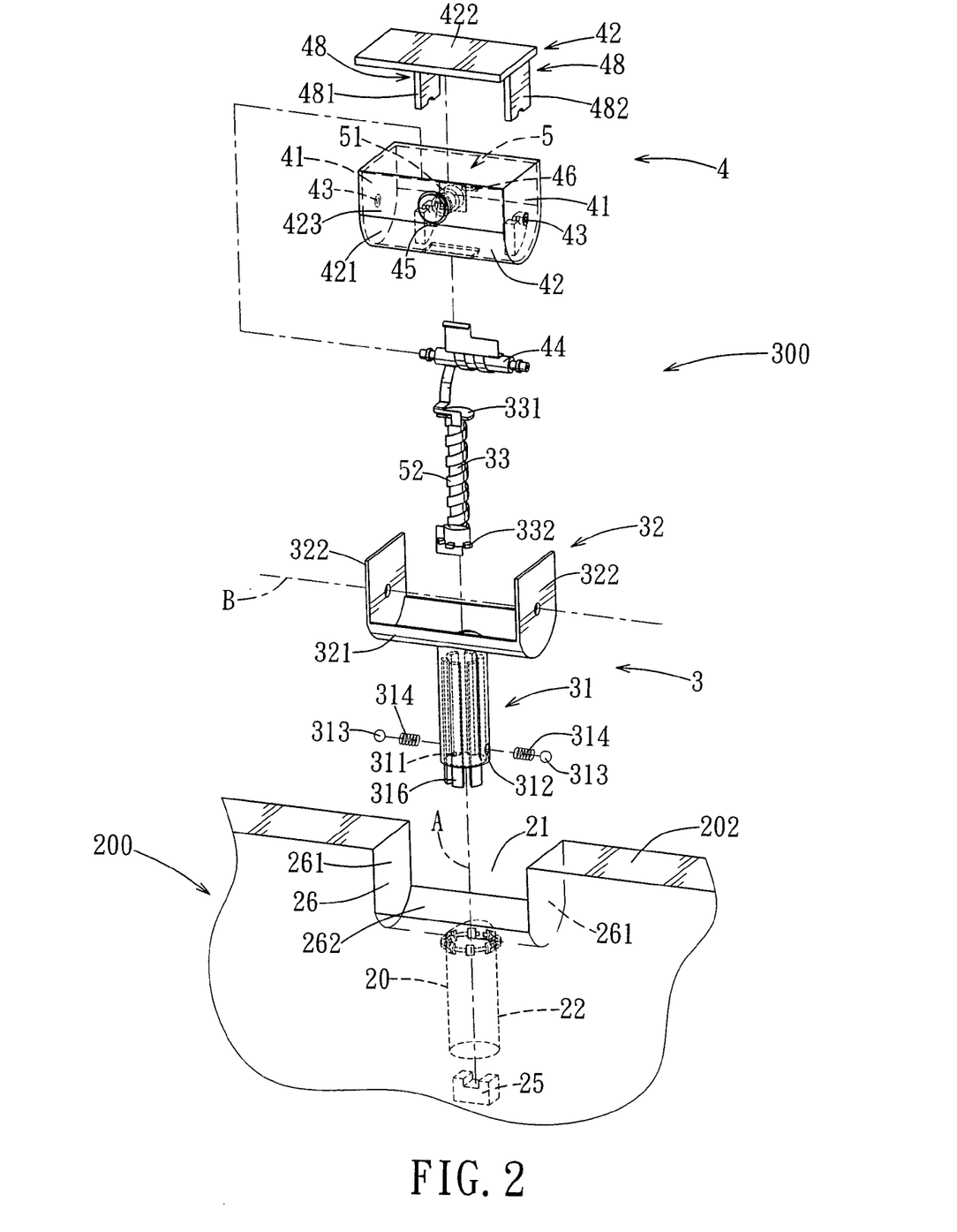
FIG. 2 is an exploded perspective view of an image-capturing device of the preferred embodiment.

Referring to FIGS. 1 and 2, the preferred embodiment of an electronic apparatus according this invention is shown to include a housing unit 200 and an image-capturing device 300.

The electronic apparatus of this embodiment is in the form of a notebook computer. In an alternative embodiment, the electronic apparatus may be one of a personal digital assistant (PDA), a mobile phone, a set-top box, and a web pad.

The housing unit 200 includes first and second housings 201, 202, each of which has opposite first and second edges.

The electronic apparatus further includes a pivot joint (not shown) that interconnects the second edges of the first and second housings 201, 202 of the housing unit 200, a keyboard 400 mounted on the first housing 201 of the housing unit 200, a liquid crystal display (LCD) 500 mounted on the second housing 202 of the housing unit 200, and an electrical connector 25 mounted in the second housing 202 of the housing unit 200.

The second housing 202 of the housing unit 200 is formed with a recess 21 that extends from the first edge thereof and that is defined by a recess-defining wall 26. In this embodiment, the recess-defining wall 26 is generally U-shaped, and includes parallel wall members 261, and an interconnecting wall member 262 that interconnects the parallel wall members 261 thereof.

Figure 3:
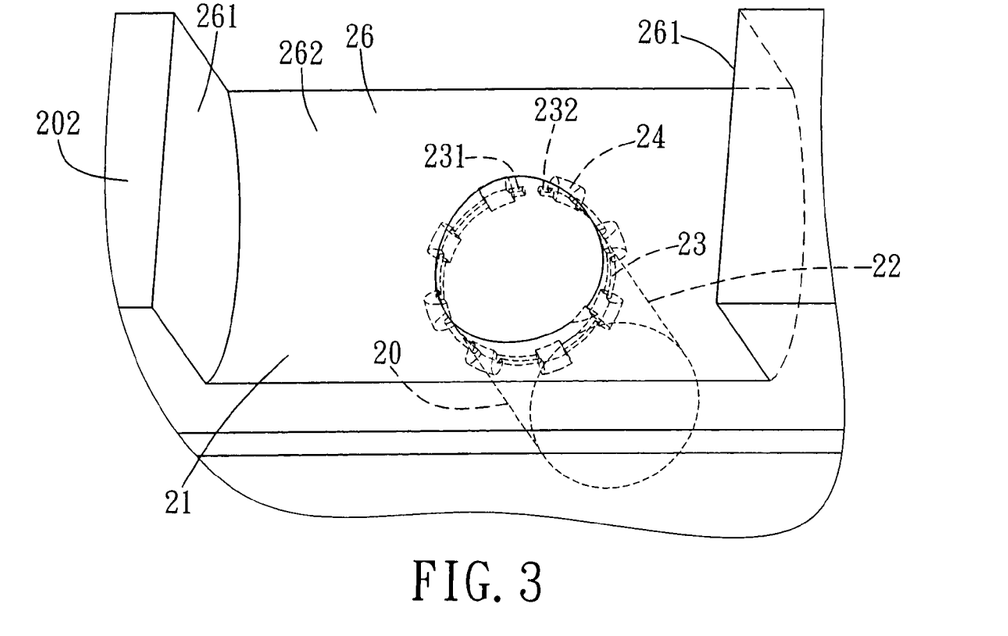
FIG. 3 is a perspective view to illustrate a shank-receiving hole in a housing unit of the preferred embodiment.

With further reference to FIG. 3, the second housing 202 of the housing unit 200 is further formed with an axially extending shank-receiving hole 20 that extends from the interconnecting wall member 262 of the recess-defining wall 26 thereof and that is defined by a hole-defining wall 22. In this embodiment, the hole-defining wall 22 is generally cylindrical in shape.

The image-capturing device 300 includes a support unit 3, a casing unit 4, and a lens unit 5.

The support unit 3 includes a shank 31 and a bracket 32. The shank 31 of the support unit 3 is tubular in shape, and extends rotatably into the shank-receiving hole 20 in the second housing 202 of the housing unit 200 so as to be rotatable relative to the second housing 202 of the housing unit 200 about a first axis, which is indicated by (A) in FIG. 2, and so as to be movable relative to the second housing 202 of the housing unit 200 along the first axis (A). The bracket 32 of the support unit 3 is coupled to the shank 31 so as to be co-rotatable therewith about the first axis (A) and so as to be co-movable therewith along the first axis (A). In this embodiment, the bracket 32 is generally U-shaped, and includes parallel arms 322, and an interconnecting arm 321 that interconnects the parallel arms 322 thereof and that is connected to the shank 31.

Figure 4:
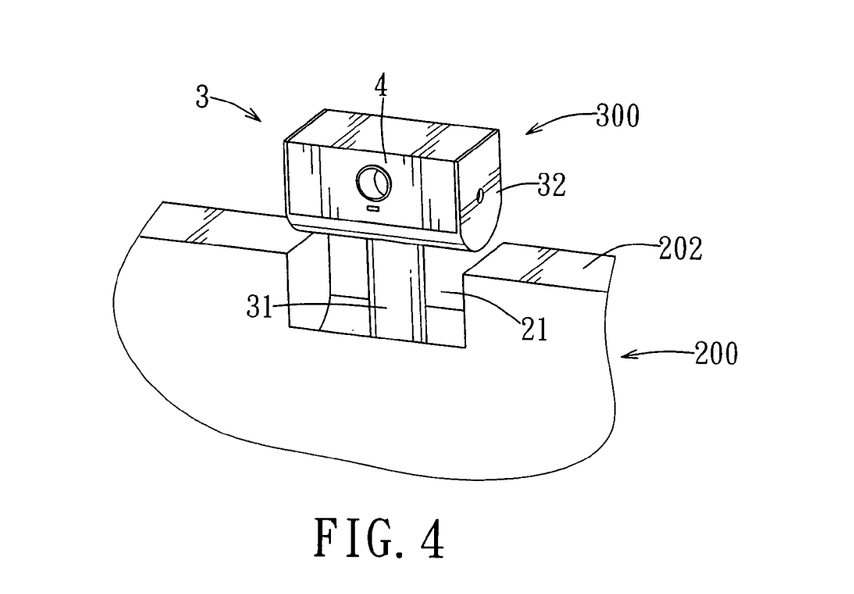
FIG. 4 is a perspective view to illustrate a state where a support unit of the image-capturing device of the preferred embodiment is disposed at an extended position.

The shank 31 of the support unit 3 is movable relative to the second housing 202 of the housing unit 200 along the first axis (A) between a retracted position, as best shown in FIG. 1, where the bracket 32 of the support unit 3 is disposed in the recess 21 in the second housing 202 of the housing unit 200, and an extended position, as best shown in FIG. 4, where the bracket 32 of the support unit 3 is disposed out of the recess 21 in the second housing 202 of the housing unit 200.

Figure 5:
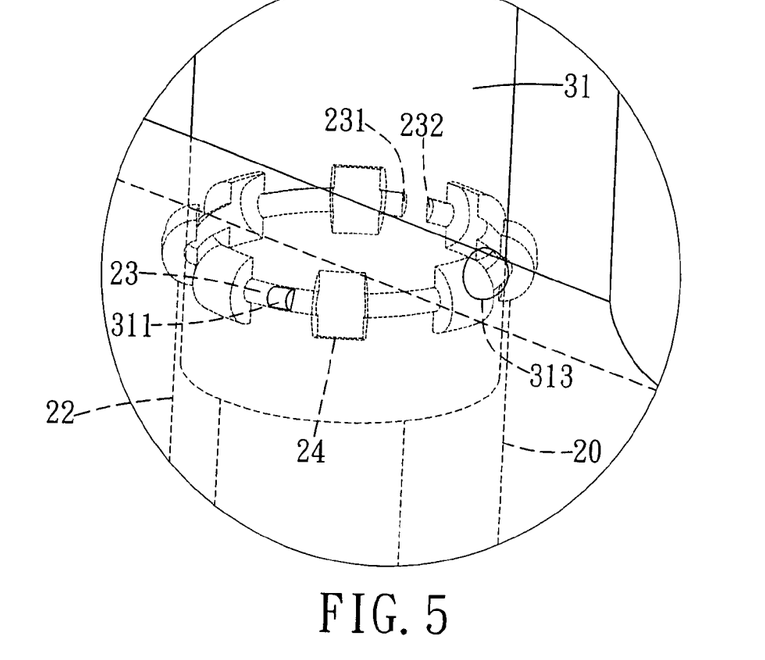
FIG. 5 is a perspective view to illustrate a retaining unit of the image-capturing device of the preferred embodiment.

With further reference to FIG. 5, the image-capturing device 300 further includes a retaining unit for retaining releasably the shank 31 of the support unit 3 at the extended position. In particular, the retaining unit includes a circumferentially extending rail groove 23 that is formed in the hole-defining wall 22 and that has opposite first and second ends 231, 232, and an engaging protrusion 311 that is provided on an outer surface of the shank 31 of the support unit 3, and that is received releasably and slidably in the rail groove 23 when the shank 31 is disposed at the extended position.

In this embodiment, the rail groove 23 of the retaining unit is a concave groove, and the engaging protrusion 311 of the retaining unit is a rounded protrusion to facilitate slidable disengagement therebetween when the shank 31 is moved from the extended position to the retracted position.

Figure 6:
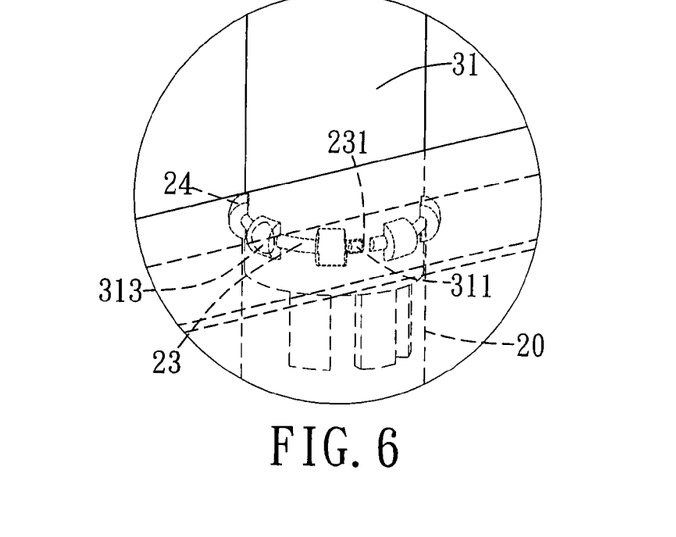
FIG. 6 is a perspective view to illustrate a state where the support unit of the image-capturing device of the preferred embodiment is disposed at a first angular position.

The shank 31 of the support unit 3 is rotatable relative to the second housing 202 of the housing unit 200 about the first axis (A) between a first angular position, as best shown in FIG. 6, where the engaging protrusion 311 is disposed at the first end 231 of the rail groove 23 and abuts against the hole-defining wall 20, and a second angular position, where the engaging protrusion 311 is disposed at the second end 232 of the rail groove 23 and abuts against the hole-defining wall 20.

The image-capturing device 300 further includes a positioning unit for retaining releasably the shank 31 of the support unit 3 at a plurality of predetermined angular positions between the first and second angular positions. In particular, the outer surface of the shank 31 of the support unit 3 is formed with diametrically opposite blind holes 312 (only one of the blind holes 312 is shown in FIG. 2). The positioning unit includes a plurality of angularly spaced apart positioning grooves 24, each of which is formed in the hole-defining wall 20 and is disposed along the length of the rail groove 23 of the retaining unit, a pair of engaging members 313, each of which extends movably into a respective one of the blind holes 312 in the shank 31 and engages releasably an aligned one of the positioning grooves 24, and a pair of biasing members 314, each of which is disposed in the respective one of the blind holes 312 in the shank 31 and abuts against the shank 31 and a respective one of the engaging members 313.

In this embodiment, each of the positioning grooves 24 of the positioning unit is a concave groove, and each of the engaging members 313 of the positioning unit is ball-shaped to facilitate slidable disengagement from the aligned one of the positioning grooves 24. Moreover, each of the positioning grooves 24 of the positioning unit has a size that is larger than the rail groove 23 of the retaining unit. Further, each of the biasing members 314 of the positioning unit is a compression spring.

The casing unit 4 is mounted on the bracket 32 of the support unit 3 in such a manner so as to be co-rotatable therewith about the first axis (A), co-movable therewith along the first axis (A), and rotatable relative thereto about a second axis which is indicated by (B) in FIG. 2 and which is transverse to the first axis (A). In particular, the casing unit 4 is disposed between the parallel arms 322 of the bracket 32 of the support unit 3, and includes lateral walls 41, and a surrounding wall 42 that interconnects the lateral walls 41 thereof. The support unit 3 further includes a pair of pivot joints 43, each of which interconnects a respective one of the lateral walls 41 of the casing unit 4 and a respective one of the parallel arms 322 of the bracket 32 of the support unit 3 and each of which permits relative rotation of the casing unit 4 and the bracket 32 of the support unit 3 about the second axis (B).

The surrounding wall 42 of the casing unit 4 has top and bottom wall members 422, 421 and a front wall member 423.

The bottom wall member 421 of the surrounding wall 42 of the casing unit 4 is provided with first and second limiting members 45, 46.

Figure 7:
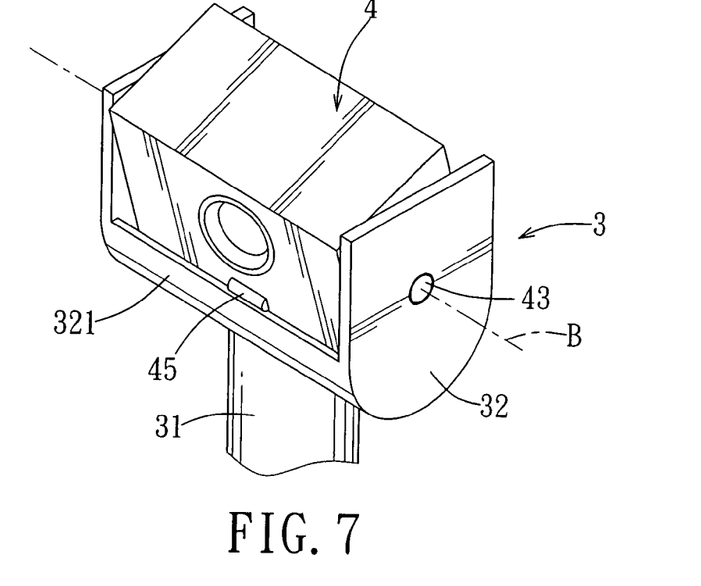
FIG. 7 is a perspective view to illustrate a state where a casing unit of the image-capturing device of the preferred embodiment is disposed at a third angular position.
Figure 8:
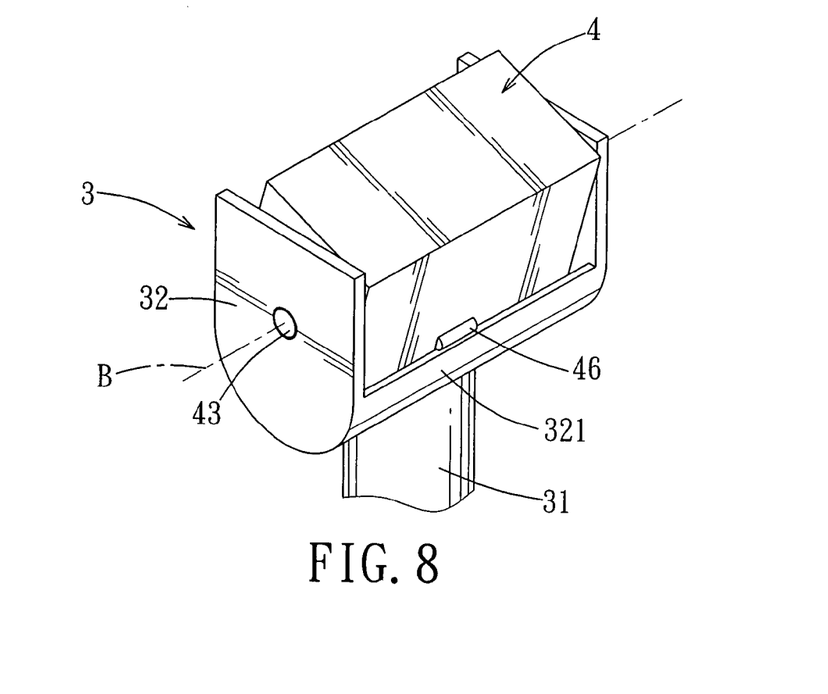
FIG. 8 is a perspective view to illustrate a state where the casing unit of the image-capturing device of the preferred embodiment is disposed at a fourth angular position.

The casing unit 4 is rotatable relative to the bracket 32 of the support unit 3 about the second axis (B) between a third angular position, as best shown in FIG. 7, where the first limiting member 45 abuts against the interconnecting arm 321 of the bracket 32 of the support unit 3, and a fourth angular position, as best shown in FIG. 8, where the second limiting member 46 abuts against the interconnecting arm 321 of the bracket 32 of the support unit 3.

It is noted herein that each of the interconnecting arm 321 of the bracket 32 of the support unit 3 and the bottom wall member 421 of the surrounding wall 42 of the casing unit 4 has an arcuate cross section along a plane transverse to the second axis (B).

The lens unit 5 includes a lens 51 mounted on the front wall member 423 of the surrounding wall 42 of the casing unit 4.

The image-capturing device 300 further includes first and second spools 33, 44.

Figure 9:
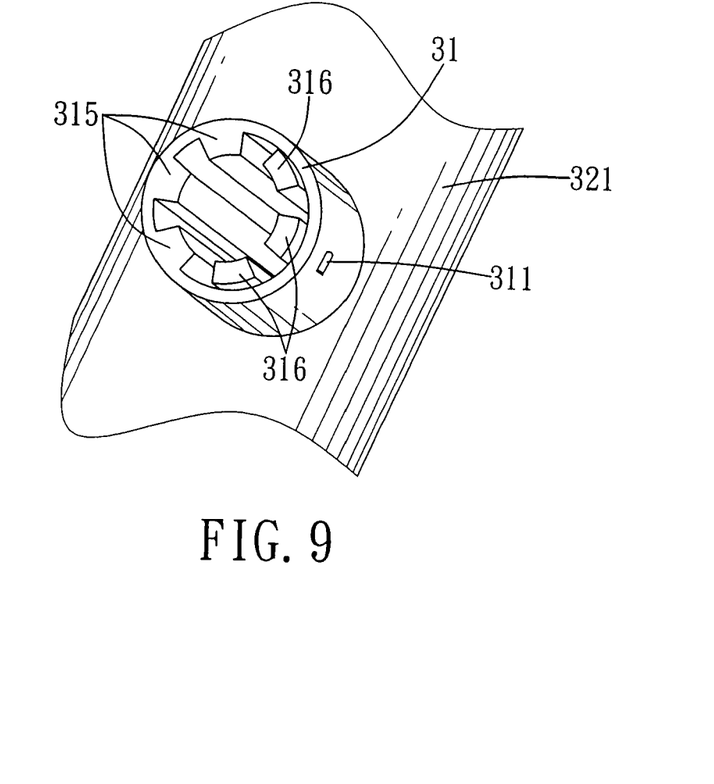
FIG. 9 is a perspective view to illustrate a shank of the support unit of the image-capturing device of the preferred embodiment.
Figure 10:
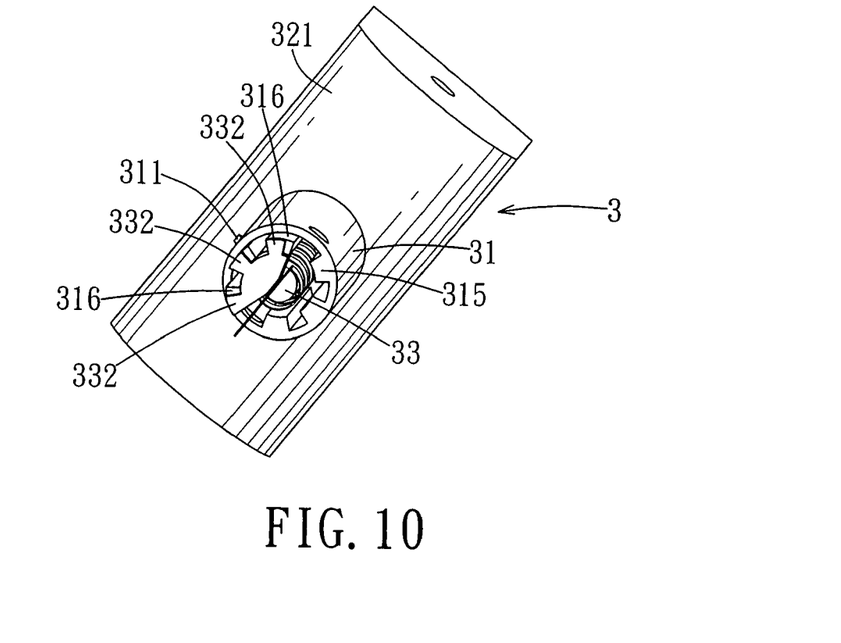
FIG. 10 is a perspective view to illustrate a first spool of the image-capturing device of the preferred embodiment.

The first spool 33 is mounted on the shank 31 of the support unit 3. In particular, with further reference to FIG. 9, the support unit 3 further includes first and second sets of ribs 315, 316. Each of the ribs 315 in the first set of the support unit 3 is provided on an inner surface of the shank 31 of the support unit 3, and has opposite first and second ends that are respectively flush with first and second ends of the shank 31. Each of the ribs 316 in the second set of the support unit 3 extends into the shank 31 of the support unit 3 and is connected to the inner surface of the shank 31. The first spool 33 has a first end that is provided with an abutting member 331 (see FIG. 2), which abuts against the first end of the ribs 315, and a second end that is provided with a plurality of abutting members 332, each of which abuts against the second end of a respective one of the ribs 316, as best shown in FIG. 10.

Figure 11:
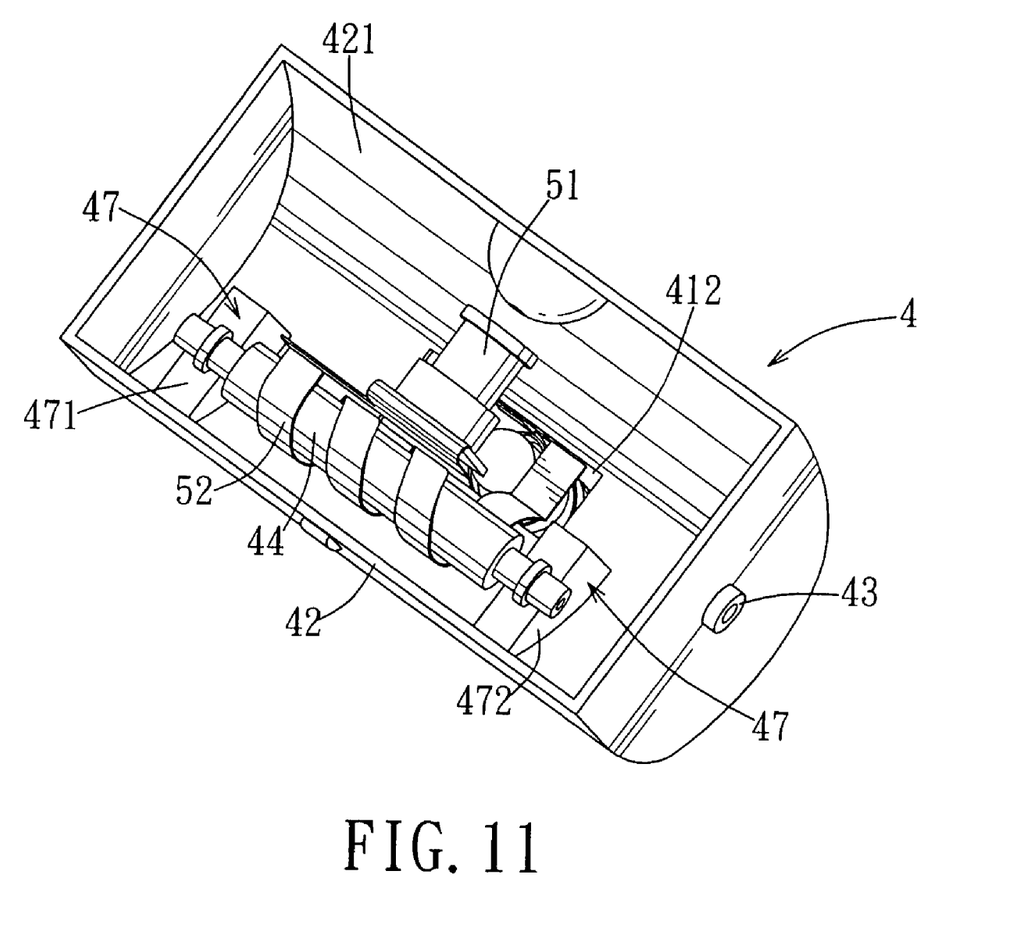
FIG. 11 is a perspective view to illustrate a second spool of the image-capturing device of the preferred embodiment.

The second spool 44 is mounted on the casing unit 4. In particular, with further reference to FIG. 11, the casing unit 4 further includes first and second mounting units 47, 48, each of which includes spaced apart first and second mounting seats 471, 481, 472, 482. The first and second mounting seats 471, 472 of the first mounting unit 47 are disposed in the casing unit 4 and are provided on the bottom wall member 421 of the surrounding wall 42 of the casing unit 4. The first and second mounting seats 481, 482 of the second mounting unit 48 are provided on the top wall member 422 of the surrounding wall 42 of the casing unit 4. The second spool 44 has a first end that is sandwiched between the first mounting seats 471, 481 of the first and second mounting units 47, 48, and a second end that is sandwiched between the second mounting seats 472, 482 of the first and second mounting units 47, 48.

The image-capturing device 300 further includes a connecting unit for connecting electrically the lens 51 of the lens unit 5 to the electrical connector 25. In particular, the connecting unit includes a flexible printed circuit board (FPCB) 52 that is coupled electrically to the electrical connector 25, that extends through the shank 31 and the bracket 32 of the support unit 3 and into the casing unit 4, that is wound on the first and second spools 33, 44, and that is coupled electrically to the lens 51 of the lens unit 5.

It is noted herein that when the shank 31 of the support unit 3 is rotated from the first angular position to the second angular position, the FPCB 52 winds on the first spool 33. On the other hand, when the shank 31 of the support unit 3 is rotated from the second angular position back to the first angular position, the FPCB 52 is unwound from the first spool 33. Similarly, when the casing unit 4 is rotated from the third angular position to the fourth angular position, the FPCB 52 winds on the second spool 44. On the other hand, when the casing unit 4 is rotated from the fourth angular position back to the third angular position, the FPCB 52 is unwound from the second spool 44.

From the above description, since the support unit 3 is rotatable relative to the second housing 202 of the housing unit 200 about the first axis (A) between the first and second angular positions and since the casing unit 4 is mounted on the support unit 3 in such a manner so as to be co-rotatable therewith about the first axis (A) and so as to be rotatable relative thereto about the second axis (B) between the third and fourth angular positions, the lens 51 of the lens unit 5 may be reoriented to different spatial orientations without having to move the housing unit 200.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic apparatus, comprising:
   a housing unit formed with an axially extending shank-receiving hole; and
   an image-capturing device including
      a support unit mounted rotatably on said housing unit so as to be rotatable relative thereto about a first axis, the support unit including
         a shank that extends rotatably into said shank-receiving hole, and
         a bracket that is coupled to said shank, wherein said bracket is generally U-shaped, and includes parallel arms, and an interconnecting arm that interconnects said parallel arms and that is coupled to said shank,
      a casing unit coupled to said support unit so as to be co-rotatable therewith about the first axis, and coupled rotatably to said support unit so as to be rotatable relative thereto about a second axis transverse to the first axis, said casing unit being disposed between and coupled rotatably to said parallel arms of said bracket, and
      a lens unit mounted on said casing unit.

2. The electronic apparatus as claimed in claim 1, wherein said casing unit includes a pair of lateral walls, said support unit further including a pair of pivot joints, each of which interconnects a respective one of said lateral walls of said casing unit and a respective one of said parallel arms of said bracket of said support unit.

3. The electronic apparatus as claimed in claim 1, wherein said casing unit includes a surrounding wall that includes a bottom wall member, each of said bottom wall member of said surrounding wall of said casing unit and said interconnecting arm of said bracket of said support unit having an arcuate cross section along a plane transverse to the second axis.

4. An electronic apparatus, comprising:
   a housing unit formed with an axially extending shank-receiving hole, said housing unit being further formed with a recess that is defined by a recess-defining wall, said shank-receiving hole extending from said recess-defining wall and being in spatial communication with said recess; and
   an image-capturing device including
      a support unit mounted rotatably on said housing unit so as to be rotatable relative thereto about a first axis, the support unit including
         a shank that extends rotatably into said shank-receiving hole, and
         a bracket that is coupled to said shank, wherein said shank is movable axially relative to said housing unit along the first axis, said bracket and said casing unit being co-movable with said shank along the first axis, said shank extending rotatably into said shank-receiving hole, and being movable relative to said housing unit along the first axis between a refracted position, where said bracket is disposed in said recess in said housing unit, and an extended position, where said bracket of said support unit is disposed out of said recess in said housing unit,
      a casing unit coupled to said support unit so as to be co-rotatable therewith about the first axis, coupled rotatably to said support unit so as to be rotatable relative thereto about a second axis transverse to the first axis, and coupled rotatably to said bracket of said support unit, and
      a lens unit mounted on said casing unit.

5. The electronic apparatus as claimed in claim 4, wherein said shank-receiving hole in said housing unit is defined by a hole-defining wall, said image-capturing device further including a retaining unit for retaining releasably said shank of said support unit at the extended position, said retaining unit including
   a circumferentially extending rail groove that is formed in said hole-defining wall, and
   an engaging protrusion that is provided on said shank of said support unit, and that is received releasably and slidably in said rail groove when said shank is disposed at the extended position.

6. The electronic apparatus as claimed in claim 5, wherein said rail groove has opposite first and second ends, said shank of said support unit being rotatable relative to said housing unit about the first axis between a first angular position, where said engaging protrusion is disposed at said first end of said rail groove and abuts against said hole-defining wall, and a second angular position, where said engaging protrusion is disposed at said second end of said rail groove and abuts against said hole-defining wall.

7. The electronic apparatus as claimed in claim 6, said image-capturing device further includes a positioning unit for retaining releasably said shank of said support unit at a predetermined angular position between the first and second angular positions, said positioning unit including
   a positioning groove that is formed in said hole-defining wall and that is disposed along the length of said rail groove of said retaining unit,
   an engaging member that engages releasably said positioning groove, and
   a biasing member that abuts respectively against said shank and said engaging member.

8. An electronic apparatus, comprising:
   a housing unit formed with an axially extending shank-receiving hole; and
   an image-capturing device including
      a support unit mounted rotatably on said housing unit so as to be rotatable relative thereto about a first axis, the support unit including
         a shank that extends rotatably into said shank-receiving hole, and a bracket that is coupled to said shank, wherein said bracket is generally U-shaped, and includes parallel arms, and an interconnecting arm that interconnects said parallel arms and that is coupled to said shank, a casing unit coupled to said support unit so as to be co-rotatable therewith about the first axis, and coupled rotatably to said support unit so as to be rotatable relative thereto about a second axis transverse to the first axis, wherein said casing unit is provided with first and second limiting members, said casing unit being rotatable relative to said support unit about the second axis between a first angular position, where said first limiting member abuts against said support unit, and a second angular position, where said second limiting member abuts against said support unit, and said casing unit being disposed between and coupled rotatably to said parallel arms of said bracket, and a lens unit mounted on said casing unit.

9. An electronic apparatus, comprising:

a housing unit formed with an axially extending shank-receiving hole and comprising an electrical connector mounted in said housing unit; and an image-capturing device including
 a support unit mounted rotatably on said housing unit so as to be rotatable relative thereto about a first axis, the support unit including
  a shank that extends rotatably into said shank-receiving hole, and
  a bracket that is coupled to said shank,
 a casing unit coupled to said support unit so as to be co-rotatable therewith about the first axis, coupled rotatably to said support unit so as to be rotatable relative thereto about a second axis transverse to the first axis, and coupled rotatably to said bracket of said support unit,
 a lens unit mounted on said casing unit,
 a connecting unit being coupled electrically to said electrical connector, extending through said shank and said bracket of said support unit and into said casing unit, and coupled electrically to said lens unit, said connecting unit comprising a flexible printed circuit board,
 a first spool mounted in said shank, and
 a second spool mounted in said casing unit, said flexible circuit board being wound on said first and second spools.

10. The electronic apparatus as claimed in claim 9, wherein said shank of said support unit is tubular and has an inner surface, said support unit further including first and second ribs that are provided on said inner surface of said shank, said first spool extending through said shank, and having opposite ends that abut respectively against said first and second ribs.

11. The electronic apparatus as claimed in claim 9, wherein said casing unit includes first and second mounting units disposed therein, said second spool being mounted on said first and second mounting units.

* * * * *